United States Patent
Krishnamoorthy et al.

(10) Patent No.: US 12,135,722 B2
(45) Date of Patent: Nov. 5, 2024

(54) SYSTEMS AND METHODS FOR DATA COMPARISON

(71) Applicant: Samsung Electronics Co., Ltd., Suwon-si (KR)

(72) Inventors: Praveen Krishnamoorthy, Fremont, CA (US); Changho Choi, San Jose, CA (US); Andrew Chang, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/091,852

(22) Filed: Dec. 30, 2022

(65) Prior Publication Data

US 2024/0020307 A1 Jan. 18, 2024

Related U.S. Application Data

(60) Provisional application No. 63/389,232, filed on Jul. 14, 2022.

(51) Int. Cl.
*G06F 16/245* (2019.01)
(52) U.S. Cl.
CPC .............................. *G06F 16/24569* (2019.01)
(58) Field of Classification Search
CPC ................................................ G06F 16/24569
See application file for complete search history.

(56) References Cited

U.S. PATENT DOCUMENTS

| | | | |
|---|---|---|---|
| 4,899,128 A | 2/1990 | Shapiro | |
| 6,374,266 B1* | 4/2002 | Shnelvar | G06F 11/1453 |
| 8,903,831 B2* | 12/2014 | Lyle | G06F 16/24553 |
| | | | 707/747 |
| 10,356,204 B2 | 7/2019 | Hazen et al. | |
| 10,637,498 B1 | 4/2020 | Li et al. | |
| 11,222,131 B2* | 1/2022 | Oberhofer | H04L 9/0894 |
| 2002/0055932 A1* | 5/2002 | Wheeler | G06F 16/25 |
| 2010/0185637 A1* | 7/2010 | Morris | G06F 16/24556 |
| | | | 707/758 |
| 2013/0198223 A1* | 8/2013 | Ahmed | G06F 16/2365 |
| | | | 707/769 |
| 2014/0280274 A1* | 9/2014 | Louis | G06F 16/252 |
| | | | 707/758 |
| 2015/0134672 A1* | 5/2015 | Ren | H04L 67/06 |
| | | | 707/747 |
| 2020/0034361 A1* | 1/2020 | Zhang | G06F 16/2456 |
| 2020/0117642 A1* | 4/2020 | Bhandaru | G06F 12/1408 |
| 2021/0089498 A1* | 3/2021 | Park | G06F 16/137 |
| 2021/0390081 A1* | 12/2021 | Neill | G06F 16/1734 |
| 2022/0188324 A1* | 6/2022 | Ramesh | G06F 16/258 |

* cited by examiner

*Primary Examiner* — Jared M Bibbee
(74) *Attorney, Agent, or Firm* — Lewis Roca Rothgerber Christie LLP

(57) ABSTRACT

A method includes receiving, at a hardware circuit of a device, a target value corresponding to a target data. The method further includes outputting, from the hardware circuit, a first indicator that source data corresponds to the target value. The method further includes, based on the first indicator, outputting, from software executing at the device, a result indicator that the source data corresponds to the target data.

20 Claims, 9 Drawing Sheets

SYSTEMS AND METHODS FOR DATA COMPARISON

CROSS-REFERENCE TO RELATED APPLICATION(S)

The present application claims priority to and the benefit of U.S. Provisional Application No. 63/389,232, filed Jul. 14, 2022 entitled "METHODOLOGY FOR HARDWARE ACCELERATED DB SCANS INVOLVING STRINGS," the entire contents of all which is incorporated herein by reference.

FIELD

The present disclosure generally relates to systems and methods for data comparisons.

BACKGROUND

Many applications, such as database applications, utilize data comparisons when performing various operations. For example, a database scan operation may compare database data elements (e.g., strings) to a target data element (e.g., string) to identify database elements that include the target data element. However, determining whether two data elements (e.g., strings) are the same may be computationally expensive.

The above information disclosed in this background section is only for enhancement of understanding of the background of the disclosure and therefore it may contain information that does not constitute prior art.

SUMMARY

In various embodiments, described herein include systems, methods, and apparatuses related to resource isolation in computational storage devices.

A method includes receiving, at a hardware circuit of a device, a target value corresponding to a target data. The method further includes outputting, from the hardware circuit, a first indicator that source data corresponds to the target value. The method further includes, based on the first indicator, outputting, from software executing at the device, a result indicator that the source data corresponds to the target data.

A system includes a hardware circuit configured to receive a target value corresponding to a target data. The hardware circuit is further configured to output a first indicator that source data corresponds to the target value. The system further includes a processor executing software configured to, based on the first indicator, output a result indicator that the source data corresponds to the target data.

A device includes a processor and a hardware circuit configured to receive a target value corresponding to a target data from a computational storage application executing at the processor. The hardware circuit is further configured to output a first indicator that source data corresponds to the target value to software executing at the processor. The software is configured to, based on the first indicator, output a result indicator that the source data corresponds to the target data to the computational storage application.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
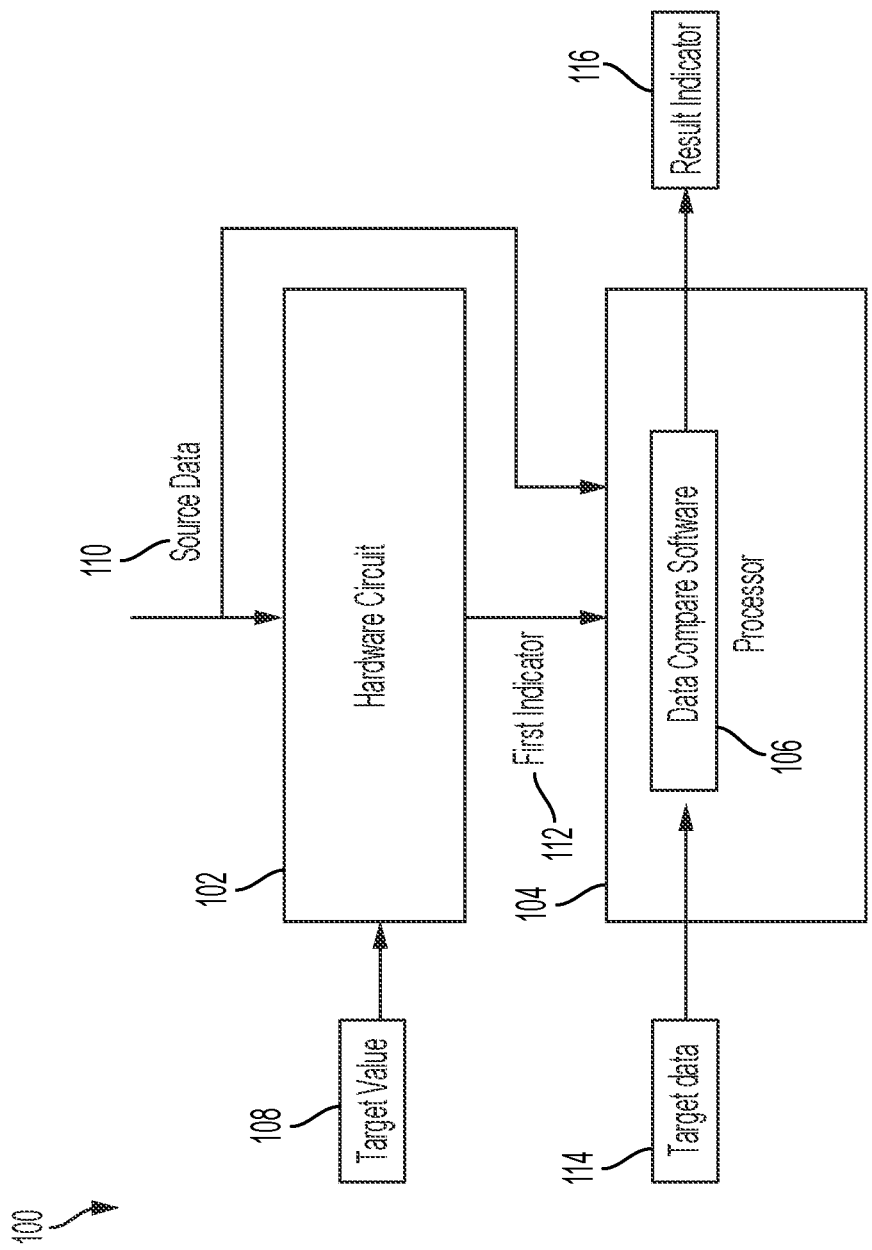
FIG. 1 is a diagram of a system for performing data comparisons.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF THE DRAWINGS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As used herein, a computational storage device (CSD) refers to a storage device that supports computational tasks. For example, a CSD may include a storage element (e.g., non-volatile memory, such as flash memory, a hard disk drive, etc.) and a compute element (e.g., a central processor unit (CPU), graphics processor unit (GPU), a field programmable gate array (FPGA), an application specific integrated circuit (ASIC) (such as a tensor processing unit), processor core, etc.) and be configured to support storage of data at the compute element and execution of computational tasks at the compute element. Accordingly, a CSD may provide storage capabilities to a host device (e.g., a computing device) and may support offloading of computational tasks from the host device to the CSD device.

In some examples according to the disclosure, a computational storage device (CSD) includes more than one compute engine and more than one storage source. Examples of media sources include, storage media (e.g., flash chips, such as NAND flash chips, flash media packages, resistive random access memory devices, hard disk devices, etc.) storage channels (e.g., NAND flash channels, etc.), other groupings of storage media, etc. The compute engines receive data from the storage sources and perform computations on the data. Because host data units (e.g., files) operated on by the computations may be split across more than one storage source, the compute engines operate on the data based on locations of delimiters that indicate boundaries between host data units in the data. In particular, a compute engine may begin performing computations on data that follows a first instance of a delimiter in a buffer of the compute engine. Data that precedes the first delimiter may be combined with data from an input buffer of a previous compute engine and processed elsewhere. Similarly, a compute engine may detect a final instance of a delimiter in the input buffer associated with the compute engine and stop computations at the final instance until additional data is available. In some examples, data following the final instance of the delimiter may be carried over to another input buffer to be processed by another compute engine.

The disclosed delimiter aware systems and methods may provide for parallel computations in a CSD despite misalignment between host data units and CSD data units. These systems and methods may be particular useful in RAID configurations in which data is striped across several storage sources. Further, the disclosure may be extended to systems that include host data stored across more than one CSD.

Systems and methods for accelerating comparisons are disclosed. These systems may be used to determine whether source data corresponds to target data (or some other data of interest). Aspects of the disclosed systems and methods relate to performing a first comparison to between source data and target data in hardware and performing a second comparison in software. The second comparison in software may be performed selectively based on the first comparison in hardware. The hardware comparison may be relatively faster than the software comparison and selectively performing the software comparison may reduce a number of software comparisons performed.

The disclosed systems and methods may have applications in the field of databases. A database system may include a scan/filter component. This component may be configured to scan the database system for particular data and/or to filter out particular data when returning results from the database system. In some examples, a scan involves performing a block data read and then extracting database pages, tuples from the pages, and column fields from the tuples. The scan/filter component may then operate on the tuples to identify a subset corresponding to a query. In particular, a hardware circuit of the scan/filter component may perform a first filter operation on the column fields extracted from the database pages, and a software component may selectively perform a second filter operation based on the first filter operation. Results from the second filter operation may be further filtered and/or returned to a requester or to another component of the database system for further processing.

It should be noted that the disclosed systems and methods are not limited to retrieval from a database. For example, the disclosed systems and methods may be used in streaming systems to quickly identify streamed data relevant to some criteria (e.g., a query). In some implementations, the disclosed systems and methods are implemented by a system that includes one or more computational storage devices. In such implementations, a computational storage device may accelerate data comparison operations or a portion thereof.

Referring to FIG. 1, a system 100 for performing a data comparison is shown. The system 100 includes a hardware circuit 102 and a processor 104. In some examples, the hardware circuit 102 includes a field programmable gate array (FPGA), an application-specific integrated circuit, another type of circuit, or any combination thereof. In some examples, the processor 104 includes a central processing unit (CPU), a graphics processing unit (GPU), a tensor processing unit (TPU), or any combination thereof. In some implementations, the hardware circuit 102 and the processor 104 are sub-components of a single compute element (e.g., an FGPA).

The hardware circuit 102 is connected to the processor 104. In some examples, the hardware circuit 102 is directly connected to the processor 104 and, in other examples, the hardware circuit 102 and the processor 104 are indirectly connected to each other by a communication path that includes one or more intermediate devices. The hardware circuit 102 and the processor 104 may be configured to communicate through a serial peripheral interface (SPI) protocol, an inter-integrated circuit (I2C) protocol, an advanced extensible interface (AXI) protocol, a peripheral component interconnect (PCI) protocol, a PCI express (PCIe) protocol, an Ethernet protocol, a WiFi protocol, another type of protocol or any combination thereof. It should be noted that messages between the processor 104 and the hardware circuit 102 may be encapsulated in messages of other protocols during transmission. Further, the hardware circuit 102 and the processor 104 may communicate using different protocols. In such examples, an intermediate device may translate between the different protocols.

The hardware circuit 102 is configured to generate an output value based on input data. In the illustrated example, the hardware circuit 102 receives source data 110 as input data. The input data may have a variable length while the output value may have a fixed length. The output may be a transformed version of the input data. In some examples, the hardware circuit 102 applies a hash function (such as a cyclic redundancy check (CRC) 32 hash function) to the input data to generate the output value. In some examples, the hardware circuit 102 is configured to operate on string (e.g., character sequence) input values but other data types maybe supported according to the disclosure.

The hardware circuit 102 is further configured to compare the output value to a target value associated with target data to determine whether the output value corresponds to (e.g., equals) the target value. In the illustrated example, the hardware circuit 102 compares a target value 108 that corresponds to target data 114 to an output value corresponding to the source data 110. The hardware circuit 102 may generate the target value (e.g., the target value 108) in some examples based on the target data (e.g., the target data 114). The target data and the target value may have the same relationship to each other as do the input data and the output value (e.g., the target value may be output of a hash function that receives the target data as input). It should be noted that the hardware circuit 102 may compare the output value to more than one target value. Further, the hardware circuit 102 may compare the target value (or target values) to more than one output value. For example, the hardware circuit 102 may be used to determine which of one or more source strings correspond to (e.g., have hash values that match hash values of) one or more target strings.

The hardware circuit 102 may be configured to generate an indicator based on comparing the target value to the output value, this indicator may indicate whether the output value corresponds to the input value, a location of the input data, or a combination thereof. For example, the hardware circuit 102 may output locations (e.g., a memory address, a database row identifier, a database column index, another location indicator, etc., or any combination thereof) of pieces of source data that have values corresponding to the target value 108. In the illustrated example, the hardware circuit 102 outputs a first indicator 112 based on a comparison of the target value 108 to a value generated based on the source data 110. In some examples, the hardware circuit 102 selectively generates the indicator in response to determining that the output value corresponds to the target value.

The hardware circuit 102 may include one or more sub-circuits (e.g., FPGA blocks or the like) configured to perform the operations described herein. For example, the hardware circuit 102 may include a hash value generation sub-circuit (e.g., FPGA block) and a comparator sub-circuit (e.g., FPGA block).

The processor 104 is configured to execute data compare software 106 configured to compare data elements to determine whether they match. In the illustrated example, the software 106 compares the source data 110 to the target data 114. In some examples, the data compare software 106 corresponds to string comparison software. For example, the software 106 may be configured to, for each index in a first string, compare a character at the index to a character at a corresponding index in a second string. Other string comparison techniques may be implemented by the software 106 in other examples. Further, the software 106 may support comparison of other data types. The data compare software 106 may be configured to selectively compare data based on indicators received from the hardware circuit 102. Accordingly, the system 100 may save processing resources associated with executing comparisons in the software 106 based on output of the hardware circuit 102. The software 106 is configured to generate a result indicator based on comparisons it performs. The results indicator may indicate whether source data matches target data, may indicate a location of data that matches a target data, or a combination thereof. In the illustrated example, the software 106 generates a result indicator 116 that indicates whether the source data 110 matches the target data 114, indicates a location of the source data 110, or a combination thereof. The software 106 may selectively generate results indicators for data that matches target data. It should be noted that the software 106 may compare source data to more than one element of target data. Further, the software 106 may compare more than one element of source data to target data.

Systems and devices may utilize the system 100 to identify data that matches target data. As will be described further herein, the system 100 may be used in database systems to perform filter and/or scan operations on a database for target data (e.g., strings). Operation of the hardware circuit 102 may be quicker than execution of the software 106. Accordingly, using the hardware circuit 102 to identify elements in a database that have values (e.g., hash values) that match a value of (e.g., a hash value of) target data may reduce a number of comparisons performed by the software 106. Accordingly, the filter and/or scan operation may be performed more quickly and the processor 104 may have more time to perform other operations. While described in the context of a database system, the system 100 may further be implemented in other systems to realize similar benefits.

Figure 2:
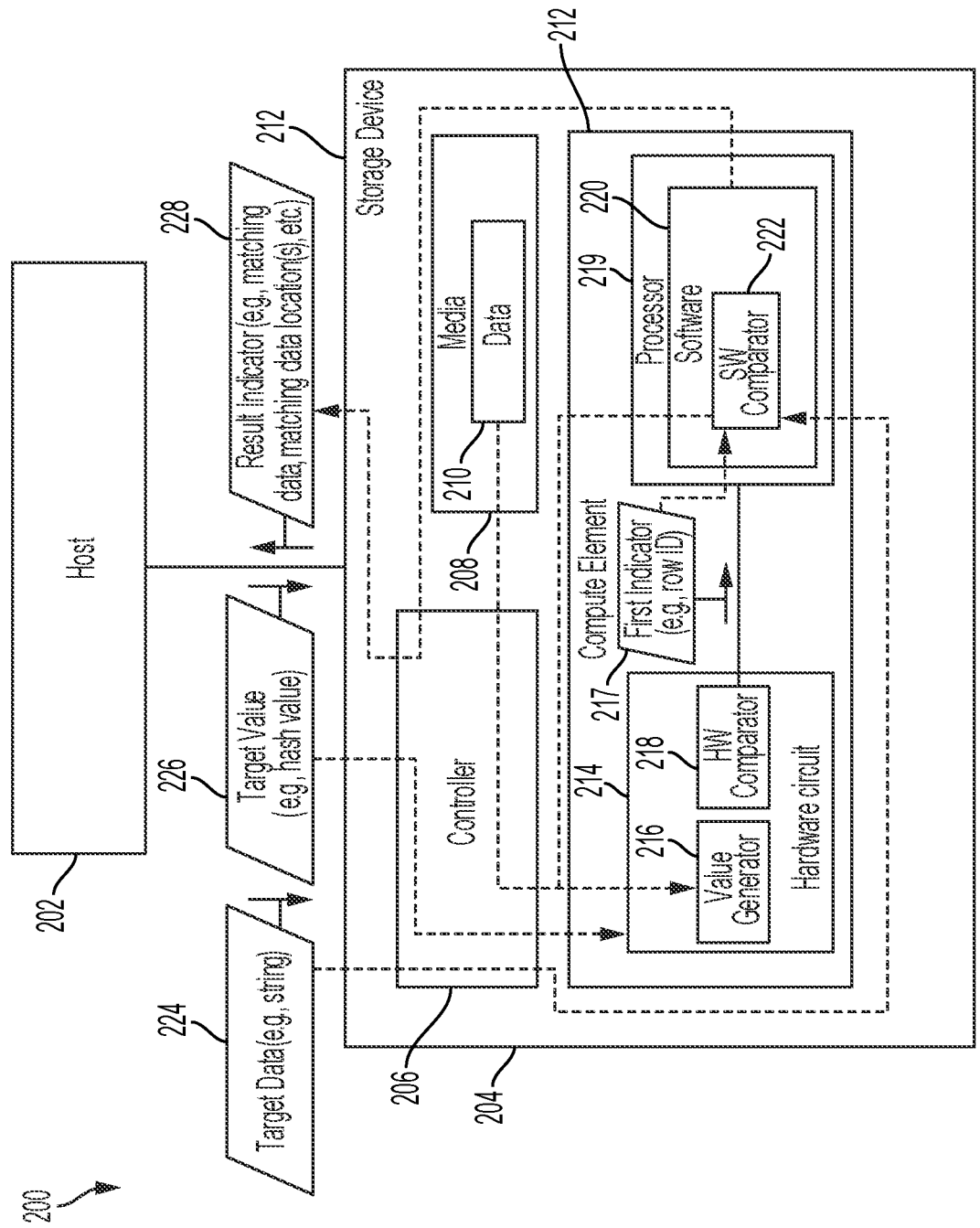
FIG. 2 is a diagram of another system for performing data comparisons.

Referring to FIG. 2, a computational storage system 200 that performs data comparison is shown. The computational storage system 200 includes a host 202 and a storage device 204 (e.g., a computational storage device). The host 202 may include a computing device, such as a server computer, a desktop computer, etc. The storage device 204 may correspond to a solid state drive, a hard disk drive, another type of storage drive, an enclosure including more than one storage drive, etc.

The storage device 204 includes a controller 206, storage media 208, and a compute element 212. The controller 206 may include an FPGA, an ASIC, a CPU, a GPU, another type of processor, or a combination thereof. The controller 206 is configured to control operations of the storage device 204, such as writing data to the storage media 208 (e.g., from the host 202), reading data from the storage media 208 (e.g., to the host 202), loading applications for execution in the compute element 212, initiating execution of applications loaded into the compute element 212, etc. In some implementations, the controller 206 corresponds to a non-volatile memory express (NVMe) controller, an NVMe over fabrics (NVMeoF) controller, another type of controller, or a combination thereof.

The storage media 208 may include flash memory, dynamic random access memory (DRAM), static random access memory (SRAM), a hard disk, another type of memory, or any combination thereof.

The compute element 212 includes a hardware circuit 214 and a processor 219. The hardware circuit 214 includes a value generator 216 and a hardware comparator 218. The compute element 212 may correspond to an FPGA and the hardware circuit 214 may correspond to an FPGA block or a group of FPGA blocks while the value generator 216 and the hardware comparator 218 correspond to blocks or sub-blocks of the hardware circuit 214. The processor 219 may include a CPU, a GPU, a TPU, etc. In some examples, the processor 219 corresponds to a processor core of an FPGA. The compute element 212 may correspond to the system 100, the hardware circuit 214 may correspond to the hardware circuit 102, and the processor 219 may correspond to the processor 104. The value generator 216 is configured to receive data and to output a value (e.g., a hash value) based on the data. The hardware comparator 218 may include an analog or digital comparator. The hardware comparator 218 is configured to receive a source value and a target value and to output an indicator based on a comparison of the target and source values. In some implementations, the hardware comparator determines whether one or more source values are equal to one or more target values and outputs an indicator identifying which of the one or more source values equals one or more of the one or more target values. For example, the hardware comparator 218 may output locations (e.g., row identifiers, column indexes, memory pointers, or a combination thereof) of data elements that have source values equal to one or more target values.

The processor executes software 220 that includes a software comparator module 222. The software comparator module 222 may correspond to the software 106. The software comparator module 222 is configured to determine whether a source data element (or source data elements) corresponds to (e.g., equals) a target data element. The software comparator module 222 may output an indicator indicating whether a source data element is equal to or includes a target data element. For example, the software comparator module 222 may output a list of source data elements that are equal to or include the target data element, may output location indicators for source data elements that are equal to or include a target data element or a combination thereof.

The host 202 is connected to the storage device 204. In some examples, the host 202 is directly connected to the storage device 204 and, in other examples, the host 202 and the storage device 204 are indirectly connected to each other by a communication path that includes one or more intermediate devices (e.g., through a fabric). The host 202 and the storage device 204 may be configured to communicate through a serial peripheral interface (SPI) protocol, an inter-integrated circuit (I2C) protocol, an advanced extensible interface (AXI) protocol, a peripheral component interconnect (PCI) protocol, a PCI express (PCIe) protocol, an NVMe protocol, an NVMeoF protocol, a serial attached SCSI protocol, a serial AT attachment protocol, an Ethernet protocol, a WiFi protocol, a remote direct memory access protocol (RDMA), another type of protocol or any combination thereof. It should be noted that messages between the host 202 and the storage device 204 may be encapsulated in messages of other protocols during transmission. Further, the host 202 and the storage device 204 may communicate using different protocols. In such examples, an intermediate device may translate between the different protocols.

Components of the storage device 204 may communicate with each other through various protocols. These components may be directly connected to each other or indirectly connected to each other by a communication path that includes one or more intermediate devices. Components of the storage device 204 may communicate through a serial peripheral interface (SPI) protocol, an inter-integrated circuit (I2C) protocol, an advanced extensible interface (AXI) protocol, a peripheral component interconnect (PCI) protocol, a PCI express (PCIe) protocol, an Ethernet protocol, a WiFi protocol, another type of protocol or any combination thereof. It should be noted that messages between the processor 104 and the hardware circuit 102 may be encapsulated in messages of other protocols during transmission. Further, the hardware circuit 102 and the processor 104 may communicate using different protocols. In such examples, an intermediate device may translate between the different protocols.

In the illustrated example, the host 202 sends target data 224 (e.g., a string) and a target value 226 to the storage device 204. The target data 224 and the target value 226 may be sent as part of a database filter or scan query from the host 202 (e.g., from a database application executing at the host 202 or from an application accessing a database application executing at the storage device 204). In some implementations, the host 202 may send the target data 224 and the target value 226 as a single message and in other implementations they may be sent as separate messages. In still further implementations, the host 202 sends the target data 224 and the storage device derives the target value 226 (as described further below) rather than the host 202 sending the target value 226 to the storage device 204. In some examples, the host 202 may specify more than one target data element (e.g., more than one string) in a particular request. Such a request may include a target value (e.g., hash value) for each of the target data elements or the storage device may derive target values for each of the target data elements.

The controller 206 receives the target data 224 and the target value 226 and forwards the target value 226 to the hardware circuit 214. It should be noted that in some implementations, the controller 206 sends the target data 224 to the hardware circuit 214 rather than the target value 226 and the value generator 216 generates the target value 226 based on the target data 224 (e.g., by applying a hash function to the target data). In examples in which the target data 224 includes more than one data element (e.g., more than one string), the target value 226 may be one of several target values sent to or derived at the hardware circuit 214 (e.g., the hardware circuit 214 may receive a vector of hash values).

The controller 206 further retrieves data 210 from the storage media 208 and forwards the data 210 to the hardware circuit 214. The data 210 may include more than one data element (e.g., multiple rows in a database). In some implementations, the host 202 indicates specific data in a request to the controller 206 and the controller 206 retrieves the specific data from the storage media 208 based on the request. For example, the host 202 may indicate a page or other unit of data to be compared to (e.g., searched for) the target data 224.

Based on the data 210, the value generator 216 generates a source value (e.g., a hash value based on the data 210. The value generator 216 may generate a source value for each element in the data 210. The hardware comparator compares the source value to the target value 226 and generates a first indicator 217 based on the comparison. In some examples, the first indicator 217 indicates a location (e.g., identifier of a row in a database, index of a column of a database, pointer to a memory location, another location indicator, or a combination thereof) including a data element (e.g., string) that has a source value (e.g., hash value) corresponding to the target value 226.

The controller 206 further sends the data 210 and the target data 224 to the software comparator module 222. Based on the first indicator 217, the software comparator module 222 selectively compares the target data 224 to the data 210. For example, the software comparator module 222 may compare data at each location identified by the first indicator 217 to the target data 224. Based on these comparisons, the software 220 generates a result indicator 228. The result indicator 228 may indicate whether the data 210 corresponds to the target data 224, identify data elements within the data 210 that correspond to the target data 224, identify locations of data elements in the data 210 that correspond to the target data 224, or a combination thereof. For example, the result indicator 228 may output strings in a database that include the target data 224. In the illustrated example, the result indicator 228 is sent to the controller 206 by the software 220, and the controller 206 sends the result indicator 228 to the host 202. In alternative implementations, the software 220 may store the result indicator 228 in the storage media 208 or send the result indicator 228 to another application executing on the storage device 204.

Because the software 220 selectively performs software comparisons on data based on results from the hardware circuit 214, the software 220 may perform fewer comparisons than systems that compare every data element to target data. Accordingly, computational resources of the storage device 204 may be saved and average comparison time may be reduced.

It should be noted that the system 200 may include additional components than those shown. For example, the storage device 204 may include more than one storage media 208. Similarly, while not illustrated, both the host 202 and the storage device 204 include one or more communications interfaces. As another example, the host 202 may include a processor, internal memory, and other components. Additionally, in some alternative examples, the host 202 may communicate directly with the compute element 212 rather than communicating with the controller 206.

Figure 3:
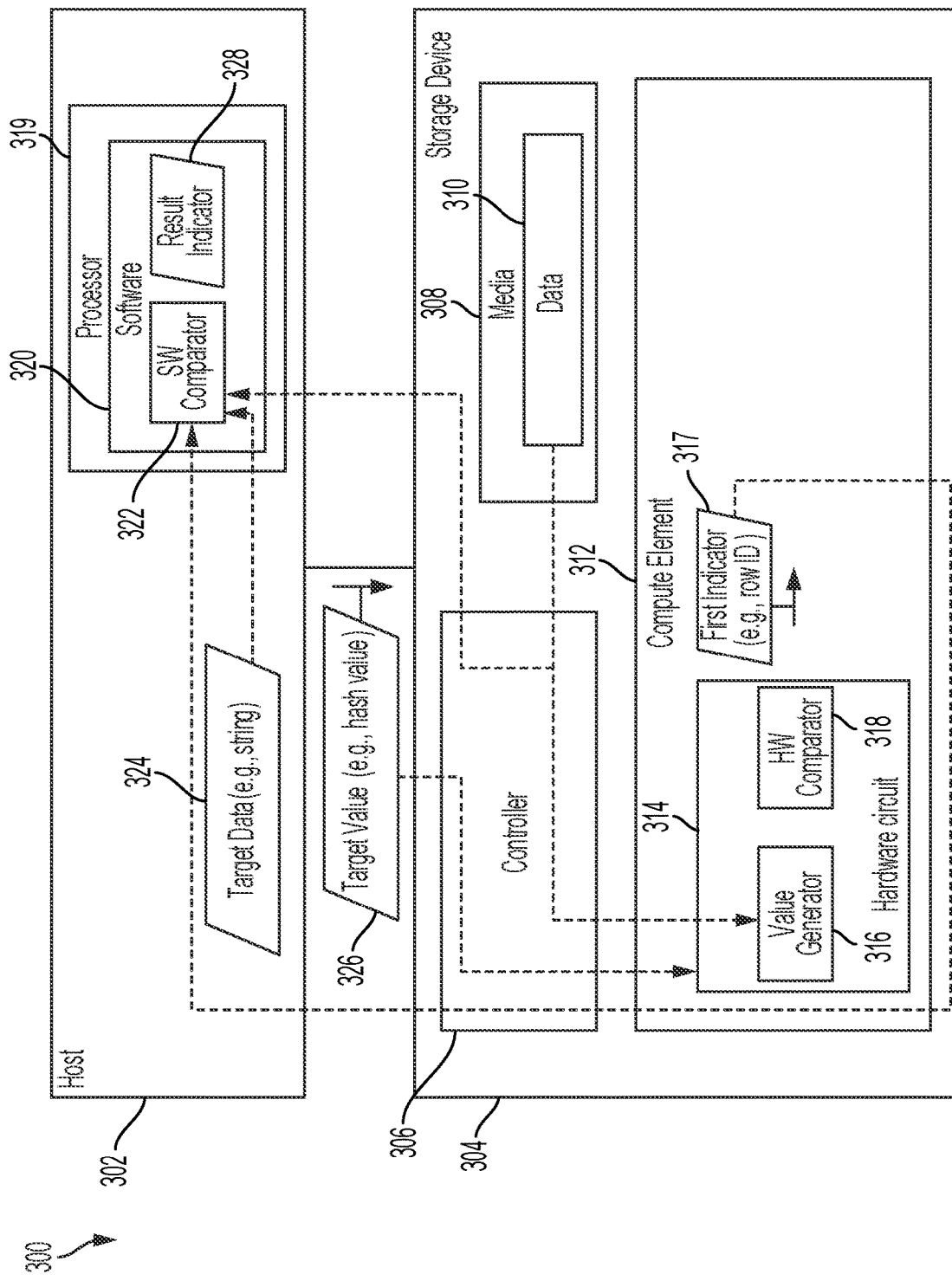
FIG. 3 is a diagram of another system for performing data comparisons.

Referring to FIG. 3, another computational storage system 300 for performing data comparisons is shown. FIG. 3 illustrates that software comparisons at one device may be selectively performed based on results of a hardware comparison at a different device. The system 300 is similar to the system 200. The system 300 includes a host 302 corresponding to the host 202 and a storage device 304 corresponding to the storage device 304. The storage device 304 includes a controller 306 corresponding to the controller 206, a storage media 308 corresponding to the storage media 208, and a compute element 312 corresponding to the compute element 212. The compute element 212 includes a hardware circuit 314 corresponding to the hardware circuit 214. The hardware circuit 314 includes a value generator 316 corresponding to the value generator 216 and a hardware comparator 318 corresponding to the hardware comparator 218. However, a processor 319 of the host 302 executes software 320 corresponding to the software 220 executed by the processor 219 of the compute element 312 in the system 200.

The host 302 and the storage device 304 may communicate according to protocols described above with respect to the host 202 and the storage device 204. Further, components of the host 302 and the storage device 304 may communicate with each other according to protocols described above with reference to the host 202 and the storage device 204.

In the illustrated example, the host 302 sends a target value 326 to the storage device 304. The controller 306 receives the target value 326 and sends the target value 326 to the hardware circuit 314. As described above with reference to FIG. 2, the target value 326 may be sent as part of a database query operation (e.g., a filter or scan request). The target value 326 corresponds to (e.g., is a hash or other value related to) target data 324. The request may further identify data 310 (e.g., a page or other unit of data). The controller 306 sends the target value 326 to the hardware circuit 314 for input into the hardware comparator 318. As in FIG. 2, the host 302 may send the target data 324 to the controller 306 and the target value 326 may be generated at the value generator 316.

Further, the controller 306 retrieves the data 310 from the storage media 308 (e.g., based on the request from the host 302) and sends the data 310 to the value generator 316. Based on the data 310 the value generator 316 generates a source value (e.g., a hash value). The value generator 316 may generate a source value for each data element (e.g., each string) in the data 310. The hardware comparator 318 compares the source value to the target value 326 and generates a first indicator 317 based on the comparison. For example, the first indicator 317 may indicate whether the source value corresponds to the target value 326, identify locations of each source data element in the data 310 that corresponds to the target value 326, identify each source data element in the data 310 that corresponds to the target value 326, or a combination thereof.

The controller 306 sends the first indicator 317 and the data 310 to a software comparator 322 of the software 320 executing at the processor 319 of the host 302. Based on the first indicator 317, the software comparator selectively compares the target data 324 to the data 310 and generates a result indicator 328 based on the comparison (or comparisons). As described above, the software comparator 322 may perform a character by character of each string in the data 310 to the target data 324 or may perform some other type of comparison operation to determine whether the target data 310 matches the target data 324. The result indicator 328 may indicate whether the data 310 corresponds to the target data 324.

Selectively performing comparisons at the software 320 based on results from the hardware circuit 314 may reduce a number of comparisons made by the software 320 to identify data that matches the target data 324. Further, the hardware comparisons are made at the storage device 304 further reducing the total number of comparisons performed at the host. Accordingly, a computational load on an application (e.g., a database application performing a scan or filter operation) executing at the host may be reduced.

Figure 4:
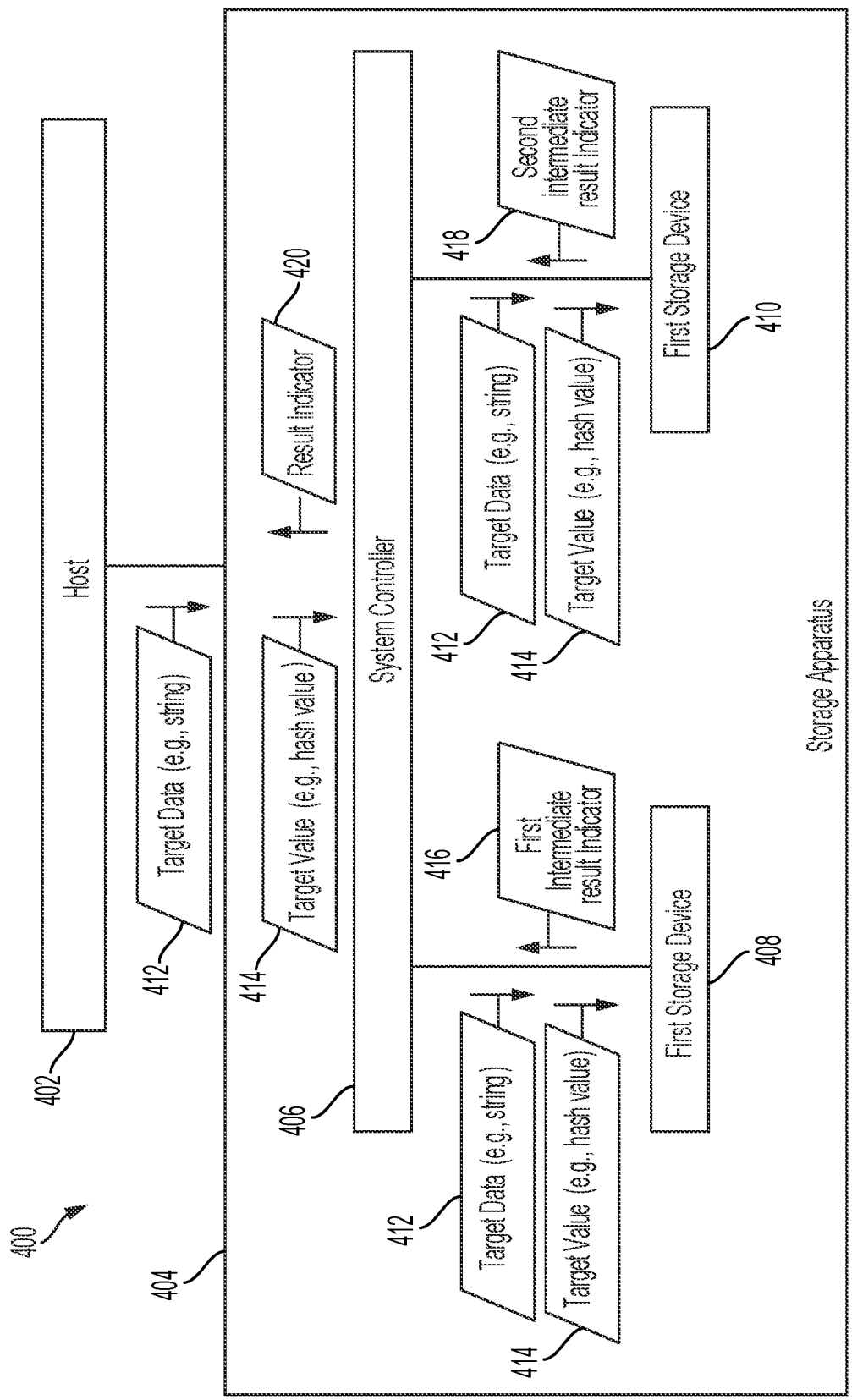
FIG. 4 is a diagram of another system for performing data comparisons.

Referring to FIG. 4, another system 400 for performing data comparisons is shown. In the system 400, more than one storage device compares target data to source data stored at the storage device. The system 400 includes a host 402 and a storage apparatus 404. While depicted as a device, the storage apparatus 404 may correspond to disaggregated system in some examples. The host 402 may correspond to the host 202 or the host 302. The storage apparatus 404 includes a first storage device 408 and a second storage device 410, and a system controller 406. The first storage device 408 and the second storage device 410 may include computational storage devices. The system controller 406 may correspond to a standalone computing device or to a processing device integrated into a server rack that includes the first storage device 408 and the second storage device 410. While only two storage devices are shown, the storage apparatus 404 may include more than two storage devices. The storage devices 408, 410 may communicate with the system controller 406 using NVMeoF, NFMe, PCIe, SAS, SATA, Ethernet, WiFi, another protocol, or a combination thereof. In some examples, the storage devices 408, 410 are directly connected to the system controller 406. In other examples, the storage devices 408, 410 are connected to the system controller 406 indirectly over a network (e.g., the Internet, a local area network, etc.).

While not shown, each of the storage devices includes a hardware circuit configured to perform a hardware comparison of a target value and a source value. The storage devices 408, 410 may have the same configuration as the storage device 204 or the storage device 304. These hardware circuits may correspond to the hardware circuit 102, the hardware circuit 214, or the hardware circuit 314. Further, the storage devices 408, 410 include processors that may correspond to the processor 219.

In operation, the host 402 sends target data 412 and a corresponding target value 414 to the system controller 406. The target data 412 and the target value 414 may be sent as part of query or request to compare the target data 412 to particular source data (e.g., a particular database page or pages) and the source data may be stored across the storage devices 408, 410. The system controller 406 may identify locations of the source data across the storage devices 408, 410 and send instructions to the storage devices 408, 410 to access data at those locations and generate result indicators (e.g., the result indicator 228), as described with respect to FIG. 2. In the illustrated example, the first storage device 408 generates a first intermediate result indicator 416 and the second storage device 410 generates a second intermediate result indicator 418. The first intermediate result indicator 416 may correspond to the result indicator 228 as generated by the first storage device 408 and the second intermediate result indicator 418 may correspond to the result indicator 228 as generated by the second storage device 410. The system controller 406 aggregates the first intermediate result indicator 416 and the second intermediate result indicator 418 and generates a result indicator 420. The system controller 406 returns the result indicator 420 to the host 402. The result indicator 420 may include translations of data locations in the first storage device 408 and the second storage device 410 to an address space recognized by the host 402. Thus, results from multiple storage devices that perform selective software comparisons based on hardware comparisons can be combined. It should be noted that the system 400 may be modified to aggregate indicators output by a hardware circuit in a storage device, such as the storage device 304, to support selective comparison of data stored across several storage devices at the host 402, as described with respect to the host 302 of FIG. 3.

Figure 5:
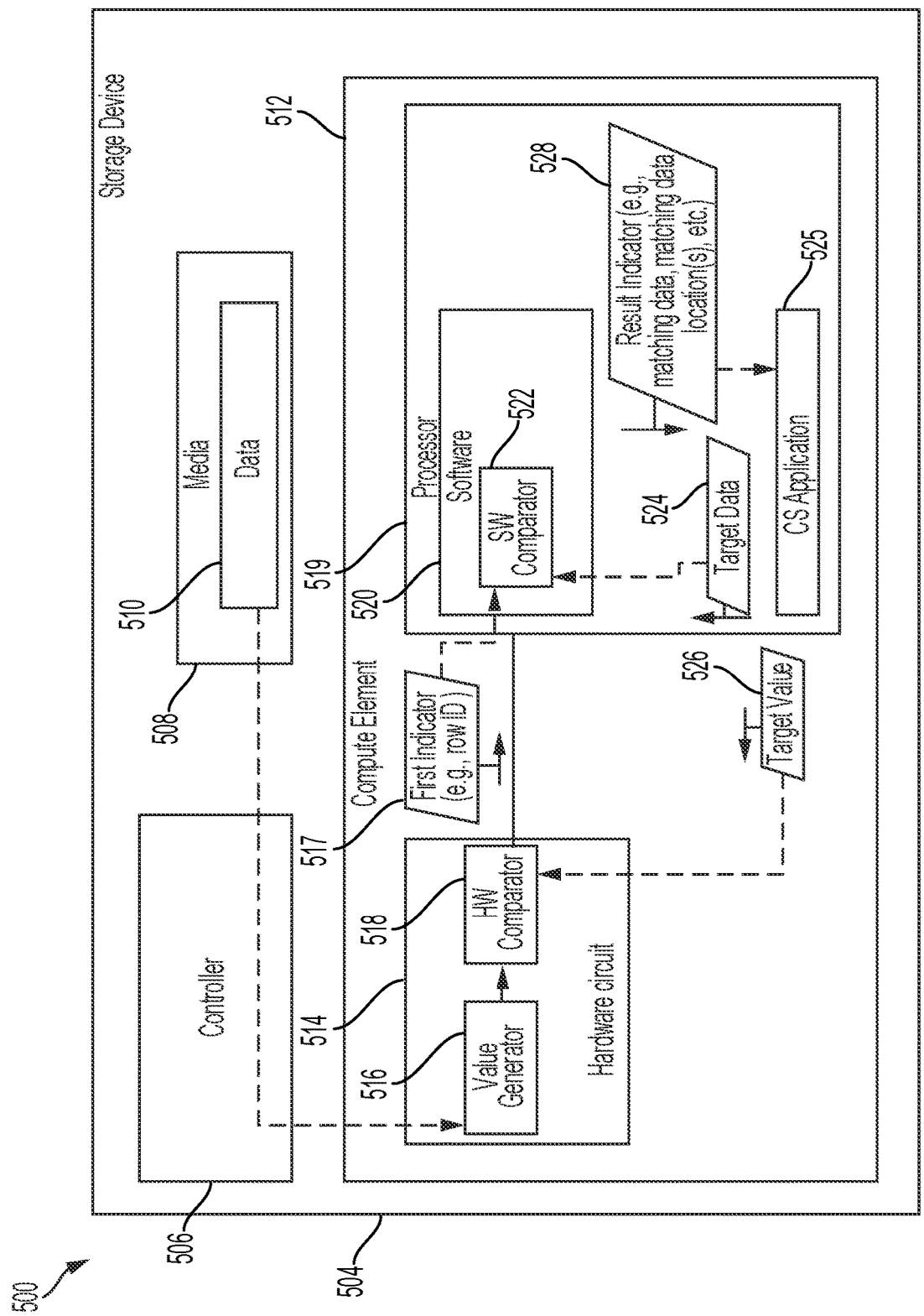
FIG. 5 is a diagram of another system for performing data comparisons.

Referring to FIG. 5, another system 500 for performing data comparisons is shown. In the system 500, data comparisons are performed at a storage device responsive to a request from an application executing at the storage device. The system 500 includes a storage device 504. The storage device 504 may generally have the same configuration as the storage device 204. Further, while not shown in FIG. 5, the storage device 504 may be connected to a host, such as the host 202, and/or be included in a storage apparatus, such as the storage apparatus 404.

The storage device 504 includes a controller 506, storage media 508, and a compute element 512. These components may have similar configurations and functions as the controller 206, the storage media 208, and the compute element 212 respectfully. The hardware circuit 514 includes a value generator 516 and a hardware comparator 518 that may have similar configuration and function to the value generator 216 and the hardware comparator 218. The processor 519 executes software 520 that includes a software comparator 522 that may correspond to the software 220 and the software comparator module 222 of FIG. 2. In addition to these, the processor 519 executes a computational storage application 525. The computational storage application 525 may include a program loaded into the storage device 504 by a host for near storage execution. It should be noted that the storage device 504 may include additional compute elements than the one illustrated and that the software 520 and the computational storage application 525 may be executed at different compute elements.

In operation, the computational storage application 525 sends a target value 526 corresponding to target data 524 to the hardware circuit 514. In alternative implementations, the computational storage application sends the target data 524 to the hardware circuit 514 and the value generator 516 generates the target value 526 based on the target data 524 (e.g., by applying a hash function). Further, the computational storage application 525 requests that the controller 506 send data 510 stored in the storage media 508 to the hardware circuit 514. The value generator 516 generates a source value based on the data 510 and the hardware comparator 518 compares the source value to the target value 526. The hardware circuit outputs a first indicator 517 to the software comparator 522 based on the comparison. The first indicator 517 may indicate whether the source value matches the target value 526, identify any data elements in the data 510 that have corresponding values that match the target value 526, identify any locations of data elements that have corresponding values that match the target value 526, or a combination thereof.

Based on the first indicator 517, the software comparator 522 selectively compares the data 510 to the target data 524. For example, the software comparator may compare data elements identified by the first indicator 517 to the target data 524. Based on this selective comparison, the software comparator 522 outputs a result indicator 528 to the computational storage application 525. The result indicator may identify whether the data 510 matches the target data 524, which data elements of the data 510 match the target data 524, locations of data elements of the data 510 that match the target data 524, or a combination thereof.

Accordingly, FIG. 5 illustrates that selective comparisons of data may be performed at a storage devices based on a request from an application originating from the storage device.

Figure 6:
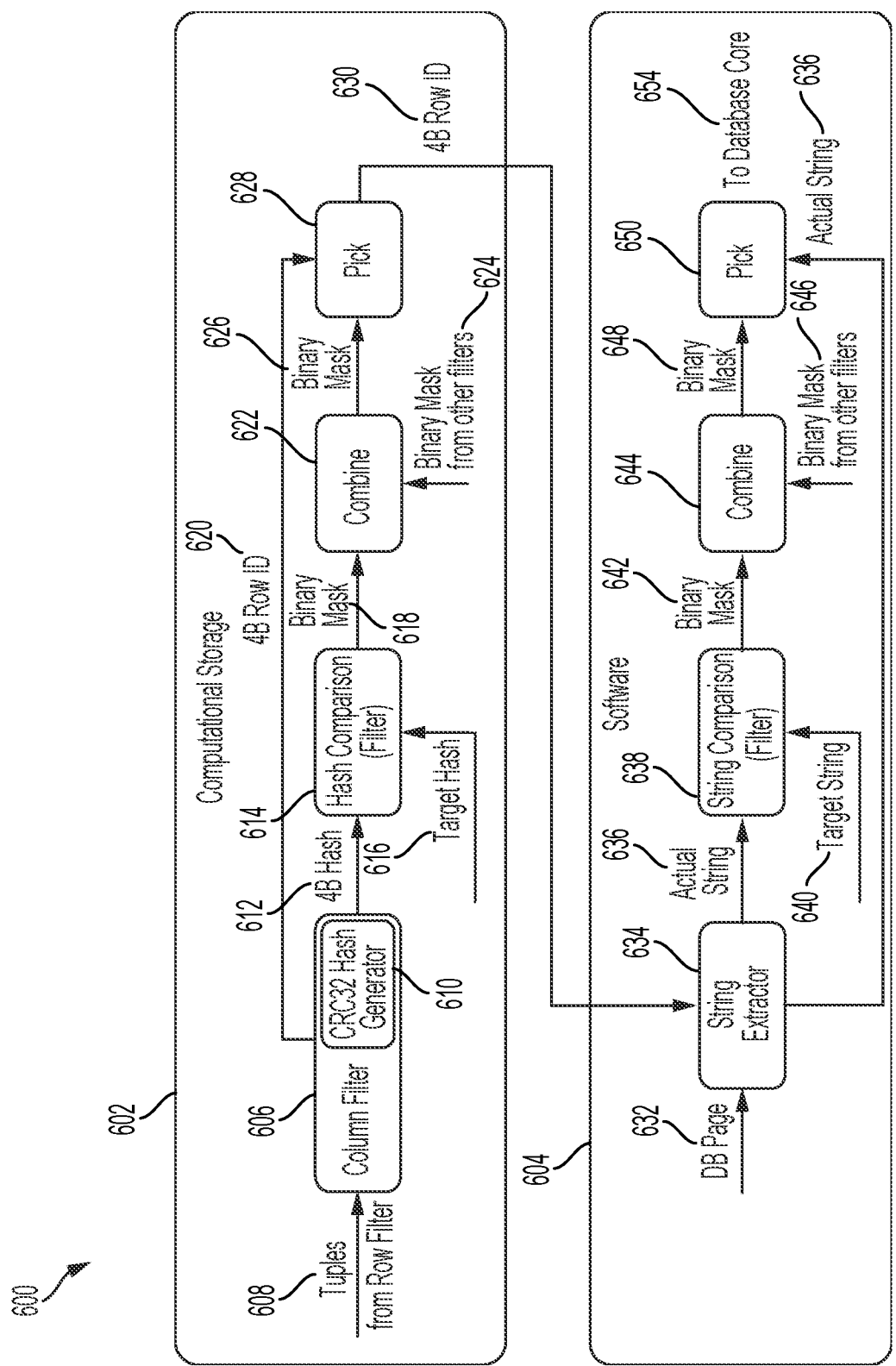
FIG. 6 is a diagram showing a system performing a data comparison.

Referring to FIG. 6, a diagram 600 showing selective comparisons in a filter and/or scan operation in a database system is shown. The diagram 600 includes a computational storage device 602 and software 604. The illustrated computational storage 602 may correspond to the hardware circuit 102, the compute element 212, the compute element 312, or the compute element 512. The illustrated software 604 may correspond to the data compare software 106, the software 220, the software 320, or the software 520.

In the illustrated example, a column filter 606 receives tuples 608 from a row filter. Each tuple may correspond to a row in a database. Each row may have several columns. Each column may have include a string. Columns in the tuple may be separated by a delimiter, such as semicolon, a comma, etc. The column filter 606 is configured to extract each string (e.g., column) from the row (e.g., based on delimiter locations) and send the string to a CRC 32 hash generator 610. The CRC 32 hash generator 610 may correspond to the value generator 216, the value generator 316, or the value generator 516. The CRC 32 hash generator 610 is configured to output a 4 byte hash value 612 based on the input string to a hash comparison block (filter) 614. The hash comparison block 614 may correspond to the hardware comparator 218, to the hardware comparator 318, or to the hardware comparator 518. The hash comparison block 614 compares the 4 byte hash value 612 of each string extracted from a row to a target hash value 616. The target hash value 616 may correspond to the target value 108, the target value 226, the target value 326, or the target value 526. In the implementation shown, the target hash value 616 is a four byte hash value. Based on the comparisons, the hash comparison block 614 outputs a first binary mask 618 indicating rows that include a string for which the 4 byte hash matches the target hash value 616. For example, a mask of [0, 1, 1] may indicate that rows 1 and 2 include strings for which a 4 byte hash generated by the CRC 32 hash generator 610 matches the target hash value 616.

A combination block 622 combines the first binary mask 618 with any other binary masks 624 from other filters to generate a second binary mask 626. For example, the combination block 622 may include a number of AND gates configured to perform an AND operation on the first binary mask 618 and the other binary masks 624. For example, the other binary masks 624 may include a binary mask generated by the system shown in the diagram 600 in a different iteration (e.g., the other binary mask may correspond to the first binary mask 618 or the second binary mask 626 generated in a different iteration of the process shown in the diagram 600). As another example, the other binary masks 624 may include a mask to select rows associated with a particular timestamp range (or timestamp), a particular device identifier, etc. One or more of the described masks may be combined into a single mask.

A picking block 628 receives 4 byte row identifiers 620 from the column filter 606 of rows in the database. Based on the second binary mask 626, the picking block 628 selects row identifiers 630 (e.g., 4 byte row identifiers) of rows in the database that include strings corresponding to the target hash value 616 (and that satisfy the other binary masks 624 from any other filters) and sends the row identifiers 630 to the software 604. The row identifiers 630 may correspond to the first indicator 112, the first indicator 217, the first indicator 317, or the first indicator 517.

The software 604 receives the row identifiers 630 and a database page 632. A string extractor 634 extracts actual strings 636 from the database page 632 that are stored in rows corresponding to the row identifiers 630. A string comparison block 638 (e.g., a filter) receives the actual strings 636 and a target string 640. The target string 640 may correspond to the target data 114, the target data 224, the target data 324, or the target data 524. The string comparison block 638 may correspond to the data compare software 106, the software comparator module 222, the software comparator 322, or the software comparator 522. The string comparison block 638 compares the target string 640 to the actual strings 636. For example, the string comparison block 638 may compare each character in the target string 640 to each character in the actual strings 636. Alternatively, the string comparison block 638 may perform a different type of comparison to identify actual strings 636 that include the target string 640. The string comparison filter 638 outputs a third binary mask 642 indicating rows that include the target string 640.

A combination block 644 combines (e.g., perform a logical and operation on) the third binary mask 642 with other binary masks 646 from any other filters to generate a fourth binary mask 648. For example, the other binary masks 646 may include a binary mask generated by the system shown in the diagram 600 in a different iteration (e.g., the other binary mask may correspond to the third binary mask 642 or the fourth binary mask 646 generated in a different iteration of the process shown in the diagram 600). As another example, the other binary masks 646 may include a mask to select rows associated with a particular timestamp range (or timestamp), a particular device identifier, etc. One or more of the described masks may be combined into a single mask. A picking block 650 then applies the fourth binary mask 648 to the actual strings 636 to identify output strings to be sent to a database core 654. The output strings may correspond to the result indicator 116, the result indicator 228, the result indicator 328, or the result indicator 528. The database core may be executing on a host (e.g., the host 202 or the host 302) or at a storage device (e.g., as the computational storage application 525.

Figure 7:
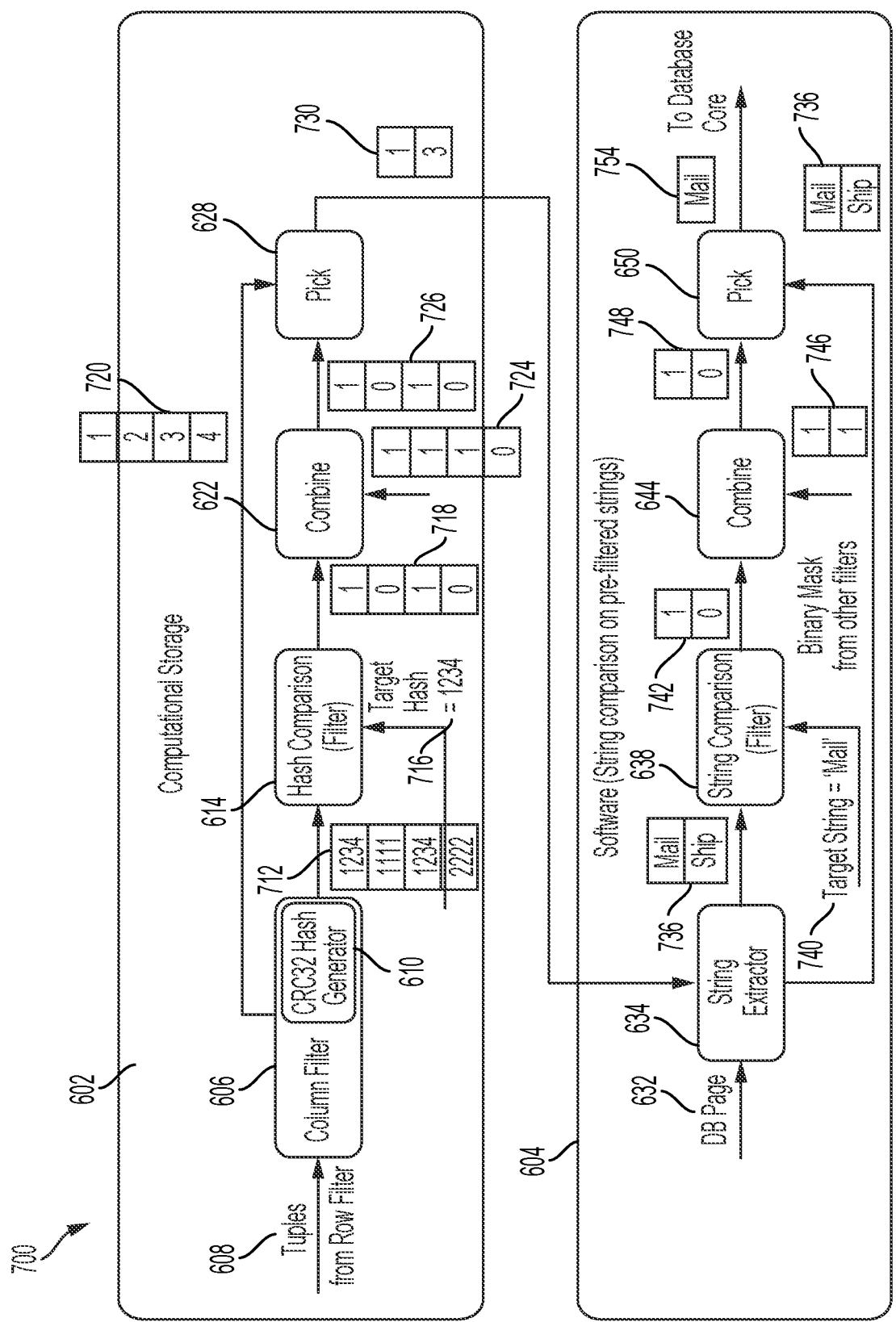
FIG. 7 is a diagram of showing more details of a system performing a data comparison.

FIG. 7 is a diagram 700 showing a specific example of the process depicted in the diagram 600. In the diagram 700, the CRC 32. Hash generator generates [1234, 1111, 1234, 2222] as hash values 712 corresponding to rows received in the tuples 608. A format of the depicted hash values is [hash for row 1, hash for row 2, hash for row 3, hash for row 4]. While each row is shown as having a single hash value, it should be noted that each row may have a hash value per column.

A target hash 716 received by the hash comparison block 614 is 1234. Based on a comparison between the hash values 712 and the target hash 716, the hash comparison block 614 outputs a first binary mask 718 of [1, 0, 1, 0] indicating that hash values for row 1 and row 3 match the target hash 716.

The combination block 622 combines the first binary mask 718 with an additional binary mask 724 of [1, 1, 1, 0] by performing a logical AND operation to generate a second binary mask 726 of [1, 0, 1, 0]. The pick block 628 applies the second binary mask 726 to a vector of row identifiers 720 to output row identifiers 730 for rows 1 and 3. These row identifiers 730 are sent to the software 604.

The string extractor 634 extracts strings 736 from the database page 632 based on the row identifiers 730. In the illustrated example, "Mail" is extracted from row 1 and "Ship" is extracted from row 3. The string comparison block 638 compares each of the strings 736 to a target string 740 ("Mail") and determines that the first row includes the target string 740 and that the third row does not. Accordingly, the string comparison block 638 generates a third mask 742 of [1, 0]. The combination block 644 combines the third mask 742 with any other masks 746 to generate a fourth mask 748. The pick block 650 then applies the fourth mask 748 to the strings extracted by the string extractor 634 to output a result string 754 ("Mail").

While the specific examples shown in FIGS. 6 and 7 relate to string filtering operations in a database, it should be noted that other types of data comparisons may be supported according to the disclosure. For example, images may be compared in some implementations. Further, the data comparisons may be performed in other contexts.

Figure 8:
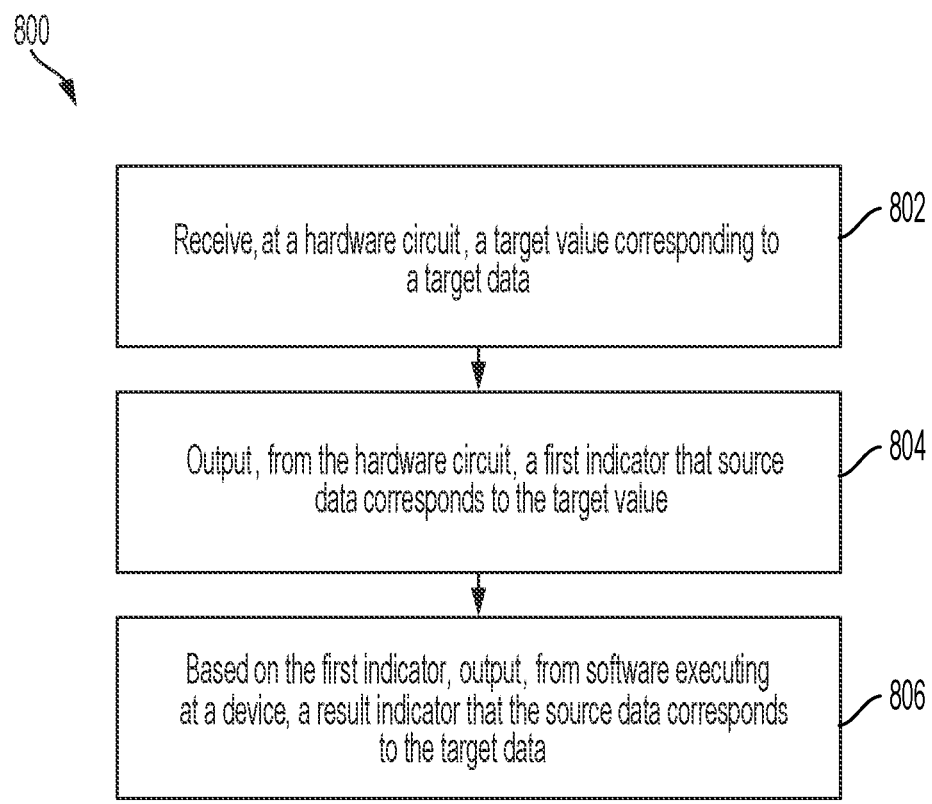
FIG. 8 is a flowchart showing a method for performing a data comparison.

Referring to FIG. 8, a method 800 of performing data comparisons is shown. The method 800 may be performed by a system including a hardware circuit and software executing on a processor. For example, the method 800 may be performed by the system 100, the system 200, the system 300, the system 400, the system 500, the system shown in the diagram 600, or the system shown in the diagram 700.

The method 800 includes receiving, at a hardware circuit, a target value corresponding to a target data, at 802. For example, the hardware circuit 102 may receive the target value 108 that corresponds to the target data 114. In some implementations, the target value is a hash value or other value derived from the target data.

The method 800 further includes outputting, from the hardware circuit, a first indicator that source data corresponds to the target value, at 804. For example, the hardware circuit may output the first indicator 112 that indicates that the source data 110 corresponds to the target value 108. In particular, the first indicator 112 may identify a location of a particular data element (e.g., a string) that corresponds to the target value 108.

The method 800 further includes, based on the first indicator, outputting from software executing at a device, a result indicator that the source data corresponds to the target data, at 806. For example, the data compare software executing at the processor 104 may perform a selective comparison of the target data 114 to the source data 110 based on the first indicator 112.

Performing comparisons at the hardware based on results of comparisons performed in hardware may reduce a number of software comparisons performed while providing accurate and flexible results.

Figure 9:
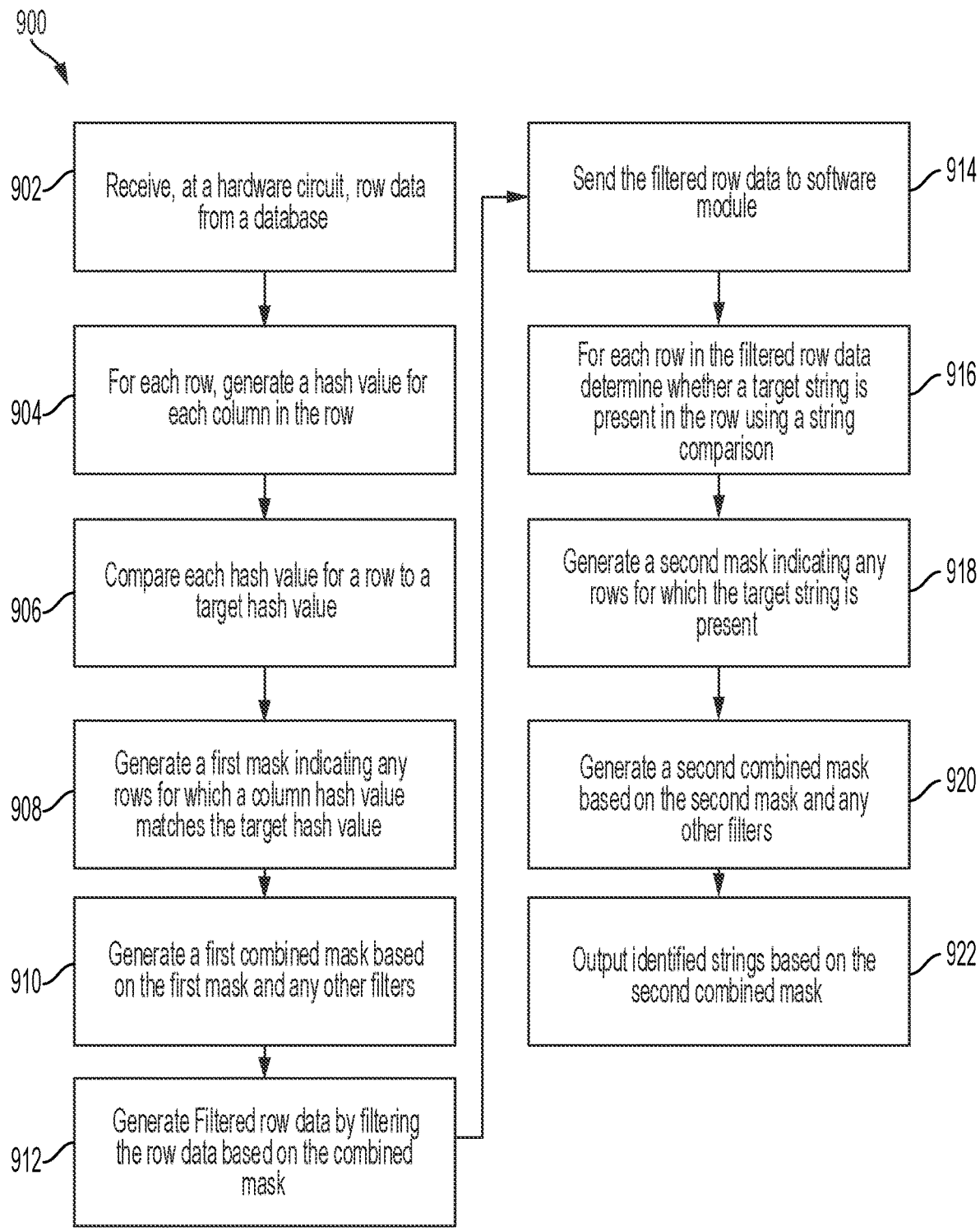
FIG. 9 is a flowchart showing another method for performing a data comparison.

Referring to FIG. 9, a method 900 for performing data comparisons is shown. The method 900 may be performed by a system including a hardware circuit and software executing on a processor. For example, the method 900 may be performed by the system 100, the system 200, the system 300, the system 400, the system 500, the system shown in the diagram 600, or the system shown in the diagram 700.

The method 900 includes receiving, at a hardware circuit, row data from a database, at 902. For example, the column filter 606 of the computational storage device 602 may receive the tuples 608 (e.g., each tuple may correspond to a row) from a database. The tuples may be received responsive to the computational storage device 602 receiving a command to perform a filter or scan operation on the database (or a particular portion of the database).

The method 900 further includes, for each row, generating a hash value for each column in the row, at 904. For example, the CRC 32 hash generator 610 may generate the 4 byte hash value 612 based on each string (e.g., each column) in each row of the tuples 608.

The method 900 further includes comparing each hash value for a row to a target hash value, at 906. For example, the hash comparison block 614 may compare the 4 byte hash values 612 to the target hash value 616 to identify hash values among the 4 byte hash values 612 that match the target hash value 616.

The method 900 further includes generating a first mask indicating any rows for which a column hash value matches the target hash value, at 908. For example, the hash comparison block 614 may output the first binary mask 618 indicating which rows include a string for which a hash value matches the target hash value 616.

The method 900 further includes generating a first combined mask based on the first mask and any other filters, at 910. For example, the combination block 622 may combine the first binary mask 618 with any other binary masks 624 to generate the second binary mask 626. The first binary mask 618 may be combined with the other binary masks 624 using an AND operation.

The method 900 further includes generating filtered row data by filtering the row data based on the combined mask, at 912. For example, the pick block 628 may apply the second binary mask 626 to the tuples 608 to generate the row identifiers 630 that identify rows in the database that have strings for which a hash value matches the target hash value 616 and which satisfy the other filters associated with the other binary mask 624.

The method 900 further includes sending the filtered row data to a software module, at 914. For example, the computational storage device 602 may send the row identifiers 630 to the software 604.

The method 900 further includes, for each row in the filtered row data, data determining whether a target string is present in the row using a string comparison, at 916. For example, the string comparison block 638 may compare the actual strings 636 in each of the rows identified by the row identifiers 630 to the target string 640.

The method 900 further includes, generating a second mask indicating any rows for which the target string is present, at 918. For example, the string comparison block 638 may output the third binary mask 642 based on comparisons of the actual strings 636 to the target string 640.

The method 900 further includes generating a second combined mask based on the second mask and any other filters, at 920. For example, the combination block 644 may combine the third binary mask 642 with any additional binary masks 646 to generate the fourth binary mask 648.

The method 900 further includes outputting identified strings based on the second combined mask, at 922. For example, the pick block 650 may output mask out strings from the actual strings 636 using the fourth binary mask 648 to output to the database core.

Thus, the method 900 may selectively perform comparisons in software based on output of a hardware comparison when scanning or filtering for a target string. Selectively using the software comparison based on results of the hardware comparison may reduce a number of software comparisons performed while providing accuracy.

In some examples, X corresponds to Y based on X matching Y. For example, a first ID may be determined to correspond to a second ID that matches (e.g., has a same value as) the first ID. In other examples, X correspond to Y based on X being associated with (e.g., linked to) Y. For example, X may be associated to Y by a mapping data structure.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an radio frequency identification (RFID) element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. Elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

The following statements describe examples according to the disclosure however the statements do not limit the scope of the disclosure.

Statement 1: A disclosed method includes receiving, at a hardware circuit of a device, a target value corresponding to a target data. The method further includes outputting, from the hardware circuit, a first indicator that source data corresponds to the target value. The method further includes, based on the first indicator, outputting, from software executing at the device, a result indicator that the source data corresponds to the target data.

Statement 2: The method of Statement 1 may further include generating a hash value based on the source data at the hardware circuit, where the first indicator is output based on the hash value corresponding to the target value.

Statement 3: In any of the methods of Statements 1 and 2, the result indicator may include a row identifier of the source data, a column address of the source data, or a combination thereof.

Statement 4: The method of any of Statements 1-3 may further include selectively comparing the source data to the target data at the software based on first indicator.

Statement 5: In any of the methods of Statements 1-4, the first indicator may include a row identifier of the source data in a database.

Statement 6: The method of claim 5, may further include selecting the row identifier based on a mask generated based on a combination of: a comparison of the target value to a value associated with the source data; and a second filter.

Statement 7: In any of the methods of Statements 1-6, the target data may be received at the hardware circuit from a host device.

Statement 8: In any of the methods of Statements 1-6, the target data may be received at the hardware circuit from an application executing at the device.

Statement 9: The method of any of statements 1-8 may further include comparing, at the hardware circuit, a second value associated with second data to the target value, where the first indicator further indicates whether the second value corresponds to the target value.

Statement 10: In any of the methods of statements 1-9, the device may include a computational storage device and the hardware circuit may include a field programmable gate array (FPGA).

Statement 11: A system may include a hardware circuit configured to receive a target value corresponding to a target data and output a first indicator that source data corresponds to the target value. The system may further include a processor executing software configured to, based on the first indicator, output a result indicator that the source data corresponds to the target data.

Statement 12: In the system of Statement 11, the hardware circuit may include a first sub-circuit configured to generate a hash value based on the source data and a second sub-circuit configured to output the first indicator based on a comparison of the hash value to the target value.

Statement 13: In the system of any of statements 11 and 12, the result indicator may include a row identifier of the source data, a column address of the source data, or a combination thereof.

Statement 14: In the system of any of Statements 1-13, the hardware circuit may be a component of a field programmable gate array (FPGA).

Statement 15: In the system of Statement 14, the processor may be a component of the FPGA.

Statement 16: A device may include a processor and a hardware circuit. The hardware circuit may be configured to receive a target value corresponding to a target data from a computational storage application executing at the processor. The hardware circuit may further be configured to output a first indicator that source data corresponds to the target value to software executing at the processor. The software may be configured to, based on the first indicator, output a result indicator that the source data corresponds to the target data to the computational storage application.

Statement 17: In the device of Statement 16, the hardware circuit may include a first sub-circuit configured to generate a hash value based on the source data and a second sub-circuit configured to output the first indicator based on a comparison of the hash value to the target value.

Statement 18: In the device of any of statements 16 and 17, the result indicator may include a row identifier of the source data, a column address of the source data, or a combination thereof.

Statement 19: In the device of any of statements 16-18, the hardware circuit may be a component of a field programmable gate array (FPGA).

Statement 20: In the device of Statement 20, the processor may be a component of the FPGA.

What is claimed is:

1. A method comprising:
   receiving, at a hardware circuit of a device, a target value corresponding to a target data;
   receiving, at the hardware circuit, source data;
   generating, by the hardware circuit, a source value corresponding to the source data;
   comparing, by the hardware circuit, the source value to the target value for a first match;
   outputting, from the hardware circuit, based on the first match, a first indicator that the source data corresponds to the target value; and
   based on the output of the first indicator from the hardware circuit, comparing, by software executing at the device, the source data to the target data for a second match; and
   outputting, from the software executing at the device, a result indicator that the source data corresponds to the target data.

2. The method of claim 1, wherein the generating includes generating a hash value based on the source data at the hardware circuit, wherein the first indicator is output based on the hash value corresponding to the target value.

3. The method of claim 1, wherein the result indicator includes a row identifier of the source data, a column address of the source data, or a combination thereof.

4. The method of claim 1, further comprising selectively comparing the source data to the target data at the software based on first indicator.

5. The method of claim 1, wherein the first indicator includes a row identifier of the source data in a database.

6. The method of claim 5, further comprising selecting the row identifier based on a mask generated based on a combination of:
   a comparison of the target value to a value associated with the source data; and
   a second filter.

7. The method of claim 1, wherein the target data is received at the hardware circuit from a host device.

8. The method of claim 1, wherein the target data is received at the hardware circuit from an application executing at the device.

9. The method of claim 1, further comprising comparing, at the hardware circuit, a second value associated with second data to the target value, wherein the first indicator further indicates whether the second value corresponds to the target value.

10. The method of claim 1, wherein the device comprises a computational storage device and the hardware circuit comprises a field programmable gate array (FPGA).

11. A system includes:
    a hardware circuit configured to:
       receive a target value corresponding to a target data;
       receive source data;
       generate a source value corresponding to the source data;
       compare the source value to the target value for a first match; and
       output, based on the first match, a first indicator that the source data corresponds to the target value; and
    a processor executing software configured to:
       based on the output of the first indicator from the hardware circuit, compare the source data to the target data for a second match; and
       output a result indicator that the source data corresponds to the target data.

12. The system of claim 11, wherein the hardware circuit includes:
    a first sub-circuit configured to generate a hash value based on the source data, wherein the source value includes the hash value; and
    a second sub-circuit configured to output the first indicator based on a comparison of the hash value to the target value.

13. The system of claim 11, wherein the result indicator includes a row identifier of the source data, a column address of the source data, or a combination thereof.

14. The system of claim 11, wherein the hardware circuit is a component of a field programmable gate array (FPGA).

15. The system of claim 14, wherein the processor is a component of the FPGA.

16. A device comprising:
    a processor; and
    a hardware circuit configured to:
       receive a target value corresponding to a target data from a computational storage application executing at the processor;
       receive source data;
       generate a source value corresponding to the source data;
       compare the source value to the target value for a first match; and
       output, based on the first match, a first indicator that the source data corresponds to the target value to software executing at the processor, the software configured to, based on the output of the first indicator, compare the source data to the target data for a second match, and output a result indicator that the source data corresponds to the target data to the computational storage application.

17. The device of claim 16, wherein the hardware circuit includes:
    a first sub-circuit configured to generate a hash value based on the source data, wherein the source value includes the hash value; and
    a second sub-circuit configured to output the first indicator based on a comparison of the hash value to the target value.

18. The device of claim 16, wherein the result indicator includes a row identifier of the source data, a column address of the source data, or a combination thereof.

19. The device of claim 16, wherein the hardware circuit is a component of a field programmable gate array (FPGA).

20. The device of claim 19, wherein the processor is a component of the FPGA.

* * * * *